TVA'S NO. 6 SUPERPHOSPHORIC ACID PLANT

Hilland Y. Allgood
Fred E. Lancaster, Jr. INVENTORS.
BY Robert A. Petruzak
Agent

VISCOSITY OF PHOSPHORIC ACID (60% TO 115%)

EFFECT OF ACID CONCENTRATION AND TEMPERATURE
ON STATIC CORROSION RATE OF UNCOOLED TYPE 316
ELC STAINLESS STEEL IN SUPERPHOSPHORIC ACID

SCREEN FOR REMOVAL OF SOLID PARTICLES FROM ACID LEAVING COOLER AND ENTERING RECYCLE ACID PUMPS TO SPRAYS IN THE HYDRATOR

SPRAY FOR REMOVAL OF SOLIDS FROM
INLET DUCT AND THROAT OF VENTURI SCRUBBER

AUTOMATIC CONTROL OF PRESSURE DIFFERENTIAL
AT THE VENTURI SCRUBBER

DESIGN OF PHOSPHORIC ACID UNIT

United States Patent Office 3,442,611
Patented May 6, 1969

3,442,611
PROCESS FOR THE PRODUCTION OF HIGHLY
CONCENTRATED PHOSPHORIC ACID
Hilland Y. Allgood, Florence, and Fred E. Lancaster, Jr., Killen, Ala., assignors to Tennessee Valley Authority, a corporation of the United States
Continuation-in-part of application Ser. No. 361,917, Apr. 22, 1964. This application Mar. 8, 1968, Ser. No. 722,511
Int. Cl. C01b 25/20; F02m 29/04
U.S. Cl. 23—165                    5 Claims

ABSTRACT OF THE DISCLOSURE

A process is described for cooling phosphorus combustion gases, hydrating $P_2O_5$, and coalescing and separating highly concentrated phosphoric acids. A novel gas cooling-hydration-coalescing vessel having sprays to minimize solids deposition and a throat dampered to permit solids passage and effective acid coalescence is utilized; screens in an acid cooler to retain and permit solids dissolution are also shown.

---

The invention herein described may be manufactured and used by or for the Government for governmental purposes without the payment to us of any royalty therefor.

This application is a continuation-in-part of our copending application Ser. No. 361,917, filed Apr. 22, 1964, and now abandoned, for Process for the Production of Highly Concentrated Phosphoric Acid.

Our invention relates to an improved process and apparatus for the production of highly concentrated phosphoric acid and more particularly to a development permitting the production of highly concentrated phosphoric acid containing up to 85 percent $P_2O_5$.

Heretofore phosphoric acid of the so-called furnace type has been produced from elemental phosphorus by burning phosphorus in a combustion chamber to form $P_2O_5$, reacting the resulting $P_2O_5$ in another chamber with water and dilute phosphoric acid to form phosphoric acid of a desired concentration, and recovering acid droplets from effluent gas by a variety of methods. It has long been accepted by the industry that corrosive conditions in the combustion chamber and hydrator are quite severe due to the presence of the corrosive acid and because of the high temperatures involved. Formerly graphite and carbon were used as the materials of construction because existent metals would not resist the corrosive environment. The equipment for the recovery of the acid droplets, however, could be constructed from metals such as stainless steel and lead because the temperatures were lower in this part of the manufacturing facility and corrosive conditions were therefore less severe. Descriptions of these earlier acid-producing units are given in the literature (Corrosion, vol. 14, August 1958, and Chemical Engineering, vol. 68, No. 19, 160–62, September 1961).

Phosphoric acid producing units are now constructed of stainless steel as a result of developments of operating techniques for protecting the steel from the hot corrosive acid. According to the newer developments, the combustion chambers and other equipment exposed to $P_2O_5$ vapor or acid at elevated temperatures are water jacketed for cooling. Enough water vapor is added to the chamber (as humidity in the air used for combustion of phosphorus or as added steam) to form a coating of viscous, noncorrosive acid on the cooled metal surface of the steel chambers. A stainless steel acid unit of the new design comprises a combustion chamber, a hydrator, a venturi scrubber for coalescing $P_2O_5$ and acid particles, and equipment for the recovery of acid droplets. The walls of the stainless steel hydrator are also generally protected from corrosion by a stream of cooled recirculated acid flowing from a launder, or the stainless steel hydrator may be lined with carbon. A stainless steel phosphoric acid unit for the production of acid of the usual concentration was described in the literature (Chemical Engineering, December 1954, page 132).

Fairly recent breakthroughs in an acid plant with the hydrator constructed of graphite or carbonaceous materials are described in U.S. Patents 2,999,010 and 3,015,540, Striplin et al. These improvements involve the addition of dilute acid to the hydrator as free falling sprays and the cooling of product acid and recirculation of part of said product acid to the hydrator as a free-falling spray. The dilute acid and the recycled product acid serve to cool the hot gases, to hydrate the $P_2O_5$ to form phosphoric acid, and to control temperatures within the system so they do not exceed those observed when dilute acid is being produced. By means of these improvements, phosphoric acid containing up to a maximum content of 80 percent $P_2O_5$ can be produced and at increased rates.

The present invention is a still further improvement on the process and equipment described in the above-mentioned Striplin patents in that, in our process, we may obtain a superphosphoric acid containing up to 85 percent $P_2O_5$ as compared to the maximum of 79.5 to 80 percent $P_2O_5$ produced when practicing the invention of Striplin. The production of a phosphoric acid containing up to 80 percent $P_2O_5$ is considered in the industry to be a significant advance in fertilizer technology. For example, the more concentrated the phosphoric acid, the more it contains new species of acid which may have potential uses in the development of still new fertilizers. However, some difficulties and disadvantages are still present in the most recent advances of the prior art. For example, the viscosity of the acid becomes much greater when the highly concentrated acid is produced. The high viscosity imposes formidable operating problems which, in the past, have prevented the production of acid containing more than about 80 percent $P_2O_5$. The extremely viscous acid will interfere with heat transfer in the cooler and with atomization of the acid sprayed into the hydrator. Solid polyphosphoric acid particles are formed under certain conditions when the highly concentrated acids are produced. These solid particles are formed at concentrations lower than 80 percent $P_2O_5$, but their formation during the process of increasing the acid concentration up to and beyond the prior-art maximum of 80 percent $P_2O_5$ presented further problems such as the stoppage of the openings in spray nozzles in the hydrator and the throat of the venturi scrubber. On the other hand, it is shown in the prior art that it is highly desirable to obtain a superphosphoric acid of the furnace type having the highest obtainable $P_2O_5$ concentration; whereas, 68 percent $P_2O_5$ acid consists entirely of orthophosphoric acid, a slightly higher concentration has pyrophosphoric as a constituent, and still higher concentrations have tripolyphosphoric acid, tetrapolyphosphoric acid, pentapolyphosphoric acid, etc. The properties of the acid change as the concentration increases and as the proportion of orthophosphoric acid in the mixture decreases. More concentrated liquid fertilizers such as 11-37-0 and suspension fertilizers such as 12-40-0 are produced from phosphoric acid containing 76 to 80 percent $P_2O_5$, in which pyrophosphoric acid is the major constituent than is possible with acid that consists entirely of orthophosphoric acid. The more concentrated the acid is, the more it contains higher molecular weight species of the acid which are believed to have uses in the development of still newer fertilizers and particularly mixed fertilizers either of the solid or liquid type having higher total plant food values. Comparisons of the compositions of 79.5 and 84.2 percent $P_2O_5$ acids are shown in Table I below.

TABLE I

[Composition of 79.5 and 84.2 Percent $P_2O_5$ Phosphoric Acid [1]]

| Constituent | Percentage of total $P_2O_5$ in— | |
|---|---|---|
| | 79.5 percent $P_2O_5$ acid | 84.2 percent $P_2O_5$ acid |
| Orthophosphoric acid | 16.7 | 3.6 |
| Pyrophosphoric acid | 43.3 | 10.6 |
| Tripolyphosphoric acid | 22.1 | 11.6 |
| Tetrapolyphosphoric acid | 10.7 | 13.1 |
| Pentaphosphoric acid | 4.5 | 12.2 |
| Hexapolyphosphoric acid | 1.9 | 9.8 |
| Heptapolyphosphoric acid | 0.8 | 8.2 |
| Octopolyphosphoric acid | 0.0 | 5.9 |
| Nonapolyphosphoric acid | 0.0 | 4.9 |
| Higher polyphosphoric acids | 0.0 | 20.2 |

[1] A. L. Huhti and P. S. Gartaganis. Can. J. Chem. 34 790 (1956).

In acid plants described in U.S. Patents 2,999,010 and 3,015,540, Striplin et al., calculations show that between 87 and 89 percent of the $P_2O_5$ from phosphorus combustion is recovered in product acid of up to 80 percent $P_2O_5$ content in a hydrator vessel, but the remaining 11 to 13 percent of the $P_2O_5$ is left in the hydrator effluent gas and must be recovered as acid by other means such as an electrostatic precipitator or a venturi scrubber-centrifugal separator unit. In an acid plant described in U.S. 3,057,700, Gross teaches that as much as 85 to 90 percent of the $P_2O_5$ from phosphorus combustion can be recovered as 25 to 75 percent $H_3PO_4$ (18–54 percent $P_2O_5$ content) by passage of the hot combustion bases at an accelerated rate through a transverse stream of acid in a converging gas-liquid flow passage, but the remaining 10 to 15 percent of the $P_2O_5$ must be recovered as acid by other means, such as a venturi scrubber-centrifugal separator unit shown in U.S. Patent 2,905,535, Atkin et al., or a packed tower. Gross did not refer to a particular type packed tower, but an extremely efficient one would be required to achieve $P_2O_5$ recovery equal to that attainable by the venturi unit or the electrostatic precipitator. Thus, the plants of Striplin or Gross require in addition to a hydrator and additional step and means to coalesce particles of acid into droplets that can be recovered.

The present invention is a still further improvement on the process and equipment in the above-mentioned Striplin et al. and Gross patents in that both the hydration of $P_2O_5$ and the coalescence of acid particles into droplets amenable to collection in a separator can be achieved solely in a venturi scrubber. Whereas the art disclosed by Striplin et al. and Gross employ after the hydration step an additional step and equipment to coalesce between about 10 and 15 percent of the $P_2O_5$ input as acid, the instant invention in one step hydrates $P_2O_5$ and coalesces about 99.9 percent of the $P_2O_5$ in acid particles that can be recovered in a centrifugal separator.

When water or dilute acid hydrates the $P_2O_5$ vapor in a gas stream, a fog or mist of acid particles forms and these particles are so difficult to coalesce and recover that an electrostatic precipitator or the venturi scrubber is required. Because the venturi involves less initial cost and less maintenance expense, it is preferred to the electrostatic precipitator. However, it is well known that gas must flow with some accelerated velocity range through liquid in the throat in order to obtain effective coalescence of dust or liquid particles in a venturi. H. F. Johnstone et al., in U.S. Patent 2,604,185, disclosed venturis of different design and one involves a rectangular-shaped throat in which the longer side walls may be moved toward or away from each other to decrease or increase open area of the throat and thereby increase or decrease gas velocity. A. B. Walker, in U.S. Patent 3,116,348, teaches that an internal and centrally mounted circular horizontal plate may be moved toward or away from the throat to decrease or increase gas velocity. G. Kiekens et al., in U.S. Patent 3,167,413, discloses square or circular frames of adjustable size to vary the opening area and liquid curtain in a device for removing particles from a gas stream. The method and apparatus with adjustable throat opening for varying gas velocity, as taught by Johnstone and Walker, but not those by Kiekens, would perhaps perform very well to coalesce acid in hydrator effluent gas from the production of dilute orthophosphoric acid, $H_3PO_4$, with a maximum of 72 percent $P_2O_5$ content. However, if their teachings were tried for coalescing particles from production of phosphoric acids of 72 to 85 percent $P_2O_5$ insurmountable problems would arise. Gas leaving the hydrator during production of acids containing 72 to 85 percent $P_2O_5$ comprises mixtures of acids with increasing numbers of phosphorus atoms in a molecule, such as pyro-, $H_4P_2O_7$; tripoly-, $H_5P_3O_{10}$; tetrapoly-, $H_6P_4O_{13}$; undecapoly-, $H_{13}P_{11}O_{34}$; and elcosapoly-phosphoric acid, $H_{22}P_{20}O_{61}$. General formula for such acids is $H(n+2)P_nO(3n+1)$, where $n$ is the number of phosphorus or P atoms in the molecule. These long-chain acids condense to form a layer of solid on the water-cooled walls of the converging inlet to the venturi throat. When a slab of solid acid breaks away from the wall, the gas stream would move it into and stop the decreased area of adjustable openings, as taught by Johnstone or Walker. Gas flow through the opening would stop and acid production by the plant would immediately stop, perhaps with serious consequences to personnel and equipment, such as rupture of walls of the hydrator or combustion chamber containing hot gases, or the blowing of gas seals containing hot acid.

The present invention is a still further improvement on the methods and apparatus in the aforementioned patents of Johnstone and Walker in that, in our process and apparatus, we control gas velocity by means of a simple sliding damper that is adjustable down or up to leave that part of the rectangular venturi throat beyond the end of the damper fully open at its original width. For example, the throat without the damper is 3 x 3 x 40 inches, and if the damper were inserted 10 inches, the opening would be 3 x 3 x 30 inches. By leaving the 3 x 3-inch opening unchanged, relatively large slabs of solid acid may pass through. A further improvement of our invention involves the addition of acid spray onto the inner walls of the converging duct to the venturi throat in order to limit the formation of slabs of solid acid. In our process, we observe that control of coalescence and recovery of acid particles could be judged by gas pressure differential within a certain range across the venturi.

It is therefore an object of the present invention to provide a process for the production of phosphoric acid containing up to 85 percent $P_2O_5$.

Another object of the present invention is to provide a process for the production of phosphoric acid containing up to 85 percent $P_2O_5$ and to provide an improved means for recovery of the solid $P_2O_5$ and acid particles from the combustion gases.

A further object of the present invention is to provide a process for the production of phosphoric acid which does not require an expensive chamber for hydrating and cooling of the hot acid gases, thereby eliminating certain disadvantages associated with processes of the prior art.

A still further object of the present invention is to provide a process for the production of phosphoric acid that does not require a system for production of dilute phosphoric acid that must be recycled to the hydration step.

A still further object of the present invention is to provide a process for the production of phosphoric acid containing up to 85 percent $P_2O_5$ and to provide means for adjustment of the acid temperature to obtain adequate fluidity of the acid without corrosion to the stainless steel apparatus and to promote dissolution of solid acid particles that form during the production of such highly concentrated phosphoric acid.

In carrying out the objectives of our invention in one form thereof, we employ a process which comprises introducing liquid phosphorus to a burning unit in a combustion chamber wherein it is atomized and burned with an excess of air; passing the hot $P_2O_5$ laden combustion gases upward through said combustion chamber and thence downward into a vertical duct; introducing cooled product acid and makeup water for hydration into said hot combustion gases in said vertical duct; passing the resulting mixture of liquid spray and combustion gases through the throat of a venturi; introducing into said mixture of liquid spray and combustion gas a spray of relatively cool product acid from a later mentioned step at a position juxtaposed the throat of said venturi; controlling the gas pressure differential within a predetermined range across the venturi throat; flowing the resulting mixture of liquid sprays and combustion gases through the venturi into centrifugal separating means; passing the gases of combustion from which the desired phosphoric acid has been separated vertically upwards from said centrifugal separating means; withdrawing the highly concentrated product acid from a lower portion of said centrifugal separating means to a cooling means; restraining agglomerated solid particles of polyphosphoric acid to movement within said cooling means; withdrawing a portion of the highly concentrated liquid phosphoric acid product from said cooling means and recycling portions of same at the above-mentioned position above the venturi and at the above-mentioned position juxtaposed the throat of the venturi; and withdrawing highly concentrated superphosphoric acid from said cooling means as product.

We have found that by the proper adjustment of the acid temperature we can obtain adequate fluidity of the acid without corrosion of the stainless steel and that such adjustment of the temperature promotes dissolution of solid acid particles that form during the production of our highly concentrated phosphoric acid; this elevated temperature also provides adequate acid fluidity for cooling and pumping. We have also found that we can completely eliminate the necessity of the rather expensive hydrating vessel as shown in Striplin et al. and can directly cool and hydrate the $P_2O_5$ values in the combustion gases in the venturi. Also, we have found that through proper modification of the venturi scrubber, we can dissolve or decrease the size and flush out layers of solid or extremely viscous polyphosphoric acid that collect on the upstream duct, and thereby avoid stoppage in the venturi throat. Further, we have found that by means of restraining screens in the cooler tank, we can retain the suspended solid phosphoric acid particles in the cooler whereby freshly produced product acid flowing therethrough causes the particles to dissolve, thereby eliminating passage of same to the recycle spray nozzles and orifices at the throat of the venturi and thus eliminating the clogging or plugging of said orifices.

And finally we have found that a novel adjustable damper can be used that does not change the cross sectional area of the venturi throat beyond the damper end; said damper can be operated by manual or automatic control to adjust gas pressure differential across the venturi scrubber, and thereby we can maintain effective cooling and a substantially low loss of $P_2O_5$ values from the stack offgasses as follows:

TABLE II.—EXAMPLES OF OPERATING CONDITIONS AT THE VENTURI SCRUBBER

| | | | | | | |
|---|---|---|---|---|---|---|
| Gas pressure differential imposed across venturi by means of damper, in $H_2O$ | [1] <20 | 32 | 35 | 44 | 54 | 61 |
| Gas entering venturi:[2] | | | | | | |
| $P_2O_5$ content, lb./hr | 3,290 | 2,752 | 4,197 | 6,954 | 4,952 | 5,900 |
| Temperature, °F | 330 | 400 | 493 | 615 | 500 | 480 |
| Gas leaving venturi, °F | 137 | 146 | 189 | 172 | 162 | 168 |
| Scrubbing acid entering venturi: | | | | | | |
| $H_3PO_4$, percent | 70.7 | 39.0 | 90.5 | 81.8 | 81.8 | 84.8 |
| Temperature, °F | 130 | 150 | 189 | 178 | 168 | 171 |
| $P_2O_5$ in stack gas, lb./hr | 50 | 2 | 7 | 4 | 2 | 3 |
| $P_2O_5$ recovery, percent [3] | 98.48 | 99.93 | 99.83 | 99.94 | 99.96 | 99.95 |
| Difference between the temperature of gas and the scrubbing acid: | | | | | | |
| Gas entering the acid, °F | 200 | 250 | 304 | 437 | 332 | 309 |
| Gas leaving the acid, °F | +7 | −4 | 0 | −6 | −6 | −3 |

[1] Without damper upstream of the venturi throat.
[2] Gas entering consists essentially of phosphorus pentoxide, phosphoric acids, oxygen, and nitrogen. Gas leaving the venturi flows through a centrifugal separator, a tower countercurrent to sprays of water and dilute acid, a mist collector pad, and thence through a stack to the atmosphere.
[3] Percent of $P_2O_5$ in gas entering venturi.

The following tabulation gives typical $P_2O_5$ losses at various gas pressure differentials across the venturi.

| | | | | | | |
|---|---|---|---|---|---|---|
| Number of tests made | 8 | 7 | 22 | 7 | 13 | 11 |
| Pressure differential, inches $H_2O$ | <20 | 22 | 32 | 38 | 45 | 56 |
| $P_2O_5$ lost in stack gas, lb./day | 1,200 | 605 | 233 | 137 | 115 | 84 |
| $P_2O_5$ recovery, percent [1] | 98.7 | 99.4 | ≅99.9 | 99.9 | 99.9 | 99.9 |

[1] Basis 4,000 lb. $P_2O_5$/hr. in gas entering venturi scrubber.

Our invention, together with further objects and advantages thereof, will be better understood from a consideration of the following description taken in connection with the accompanying drawings in which.

Figure 1:
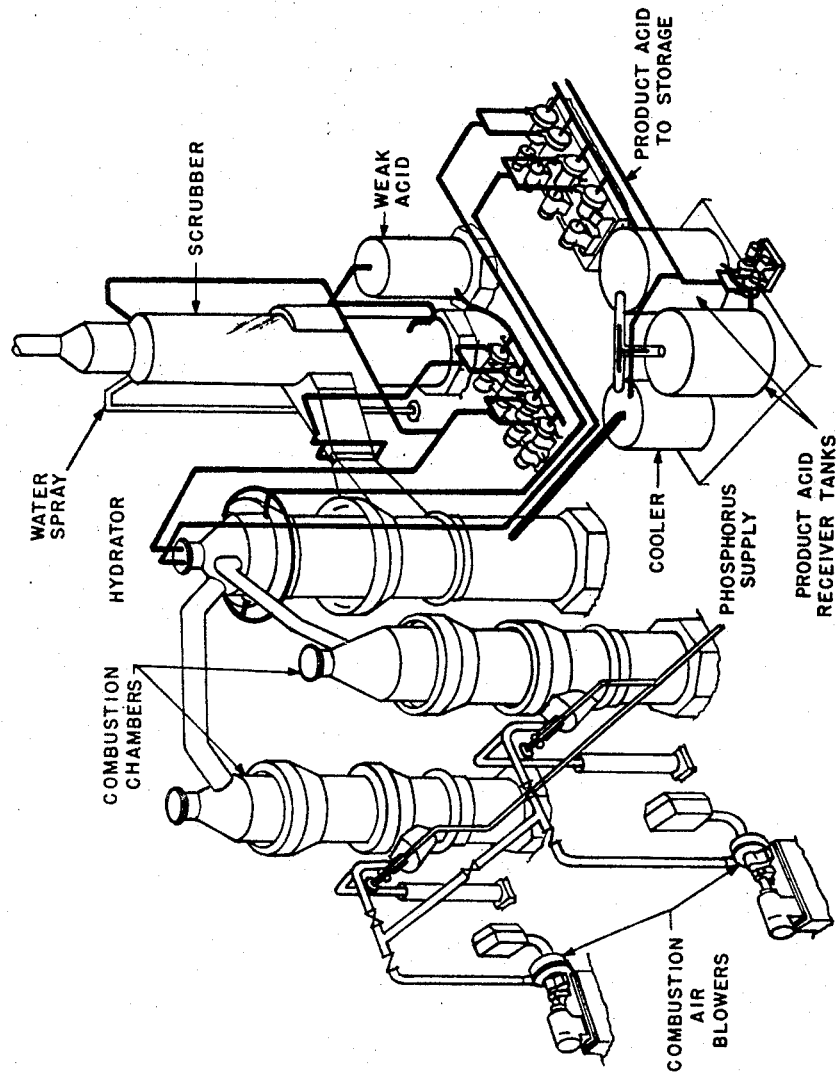
FIGURE 1 is a perspective illustration of a superphosphoric acid plant constructed to operate according to the teachings of Striplin, supra, and illustrates the proportional relationship of the hydrator required thereby.

Referring now more specifically to FIGURE 1, there is shown a stainless steel phosphoric acid producing unit incorporating the improvements taught by Striplin, supra. In our early work on the present invention, much of our original data, on which our final conclusions are based, was obtained by modifying the equipment in the process originally intended to be carried out in the apparatus shown therein. These modifications included our novel venturi damper together with incorporation of screens in the cooler tank and the acid spray nozzle in the duct upstream of the venturi throat. Therefore, the following discussion of work carried on in such apparatus is intended only to illustrate the concepts underlying our invention and to provide additional data and disclosure to those skilled in the art. The unit in this figure has two combustion chambers, both of which are connected to a hydrator by ducts. In the hydrator the hot gases are cooled and hydrated by free-falling droplets of dilute acid and free-falling droplets of cooled product acid, and by a falling film of cooled product acid down the inner walls. The cooled gases leaving the hydrator pass through a venturi scrubber that coalesces particles of $P_2O_5$ and acid, and then the gases flow through a centrifugal separator and to a separator tower and demister section to recover the acid droplets as dilute acid before the gases are exhausted to the plant stack. Water is added to the separator tower as a spray. Weak acid is collected in the venturi scrubber, separator tower, and demister. Dilute acid is recirculated through the separator tower and the venturi scrubber. Water introduced into the separator tower and a small amount of water as vapor in the air which is used for phosphorus combustion provides water for hydration of $P_2O_5$. Some of the dilute acid is then sprayed into the hydrator. The product acid draining from the hydrator is cooled and part of this cooled acid is recycled and sprayed into the hydrator.

All of this equipment is constructed of stainless steel. Water jackets provide cooling for the combustion chambers, ducts between the combustion chambers and hydrator, the hydrator, venturi scrubber, and the bottom of the separator tower. Viscous acid coats the inside of the combustion chambers, ducts, and the top of the hydrator and protects the metal from corrosion. Cooled product acid is injected as a spray in the top of the hydrator and into the hydrator along the walls to protect the walls from corrosion by the acid laden gases.

Figure 5:
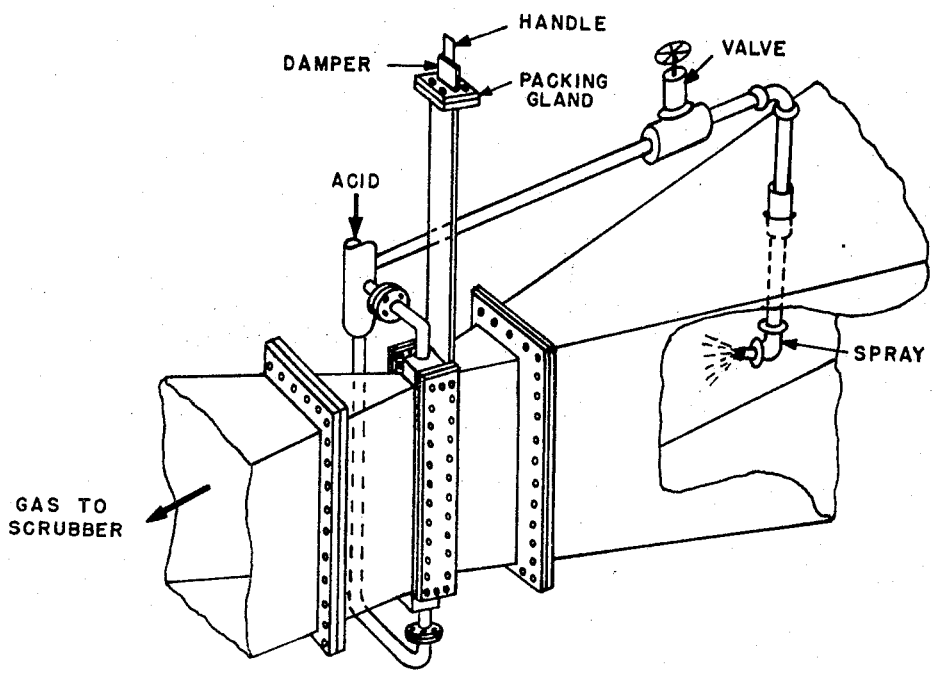
FIGURE 5 is an isometric schematic illustrating the venturi modification and shows the damping means for maintaining a constant pressure drop across the venturi scrubber and also shows the spray for removal of solids from the inlet duct and throat of the scrubber.

During initial operation, phosphorus was burned at rates up to about 50 percent of plant design capacity to produce acids of different concentrations, such as that containing 61.6 percent of $P_2O_5$ which is equivalent to 85 percent $H_3PO_4$, 76 percent $P_2O_5$ which is equivalent to 105 percent $H_3PO_4$, or 79.6 percent $P_2O_5$ which is equivalent to 110 percent $H_3PO_4$. Gas leaving the hydrator flowed through the venturi scrubber, centrifugal separator, packed tower, mist collector pad, and thence through the stack to the atmosphere. Gas leaving the stack carried droplets of 80 percent $H_3PO_4$ that fell into the operating area and created severe personal safety hazards, caused corrosion to the plant structural and nearby mild steel equipment, and created an almost intolerable atmospheric pollution problem. Analyses of gas during initial plant operation showed that the quantity of $P_2O_5$ lost in stack gas was about 80 pounds per hour or 1920 pounds per day, which represents about a 2-percent loss. At the low phosphorus burning rate the velocity of gas through the venturi was less than that for which the venturi was designed. Extra air to increase the gas velocity was not available, advisable, or even desirable. Several means to restrict the area of the venturi opening were considered to increase velocity so as to coalesce $P_2O_5$ and acid into particles of size that could be recovered; these included adjustable gates pivoted adjacent to or some distance from upstream vertical sides of the venturi throat, vertical adjustable gates pivoted midway of the duct slightly upstream of the throat, single damper midway of duct upstream of the throat, etc. All were rejected as being impractical, susceptible to failure due to corrosive attack, or excessively expensive. Finally, a novel damper assembly (as shown in FIGURE 5) was conceived that comprised a rectangular sleeve or sheath welded on one end over a rectangular slot cut in the duct just upstream of the venturi throat, fitted on the other end with a packing gland, and containing a flat plate damper adjustable down or up to decrease or increase venturi throat area and thereby increase or decrease gas velocity. A pipe connection on the side of the sleeve near the outer end permitted either addition of purge air to prevent accumulation of condensed solid acid, or addition of purge steam to melt and remove solid acid deposits that would restrict damper adjustment. This simple yet novel damper assembly was built and then installed in a matter of a few hours of plant downtime. This damper functioned well to control gas velocity that is proportional to pressure differential and thereby caused the venturi to coalesce $P_2O_5$ and acid particles to size large enough to recover. Table II supra shows that only 98.48 percent of $P_2O_5$ in gas entering the venturi was coalesced and recovered when the damper was out and pressure differential across the venturi was less than 20 inches water gage; but that 99.9 to 99.96 percent of $P_2O_5$ in gas was recovered when pressure differential was controlled by means of the damper at values between 38 and 60 inches water gage. The tabulation following Table II supra shows that 1200 pounds of $P_2O_5$ was lost in stack gas per day when pressure differential was less than 20 inches, but only 84 pounds per day when pressure differential was 56 inches water gage. A pressure differential between 45 and 55 inches water gage is preferred. Thus, the performance of a venturi equipped with our novel damper effectively cooled inlet gas from 615° F. to temperatures within a few degrees of the inlet scrubbing acid (i.e., for example, approximately 170° F.) and caused coalescence of $P_2O_5$ and acid into particles so that 99.9 to 99.96 percent of the $P_2O_5$ in the gas was recovered; this suggested that both hydration of $P_2O_5$ and coalescence of acid could be achieved for production of acid of 72 to 85 percent $P_2O_5$ content in a venturi scrubber equipped with our novel damper unit.

These data and observations show that the need for a separate hydrator tower can be completely eliminated using our new and novel venturi damper. Further, this proposed arrangement (i.e. no separate hydrator tower) facilitates production of highly concentrated acid by eliminating the source of much crystallization of acid particles. The arrangement also requires less construction materials, pumps, tanks, and piping, simplifies the design, decreases plant area requirement, decreases construction cost, requires less time of an operator as well as facilitates production of acid of the usual concentration. Of course, since the hydrator vessel is eliminated, increased cooling for recycle product acid must be provided.

Our rectangular damper plate may be solid or it may be hollow with inlet water cooling tube extended to near the end inside the venturi area, and with a water outlet near the outer end for cooling to prevent corrosion. However, under usual operating conditions, our solid damper of type 316L stainless steel corrodes at 10 mils or less per year.

Figure 2:
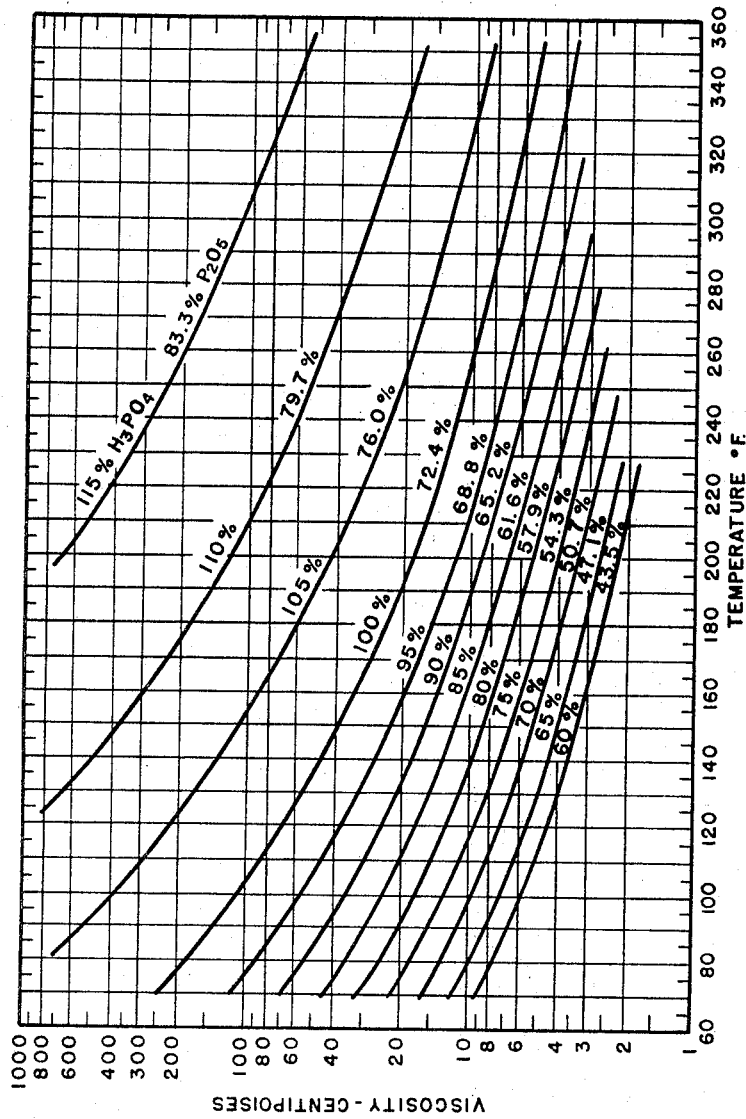
FIGURE 2 is a graphical illustration of the viscosity of phosphoric acid at various concentrations and temperatures.
Figure 3:
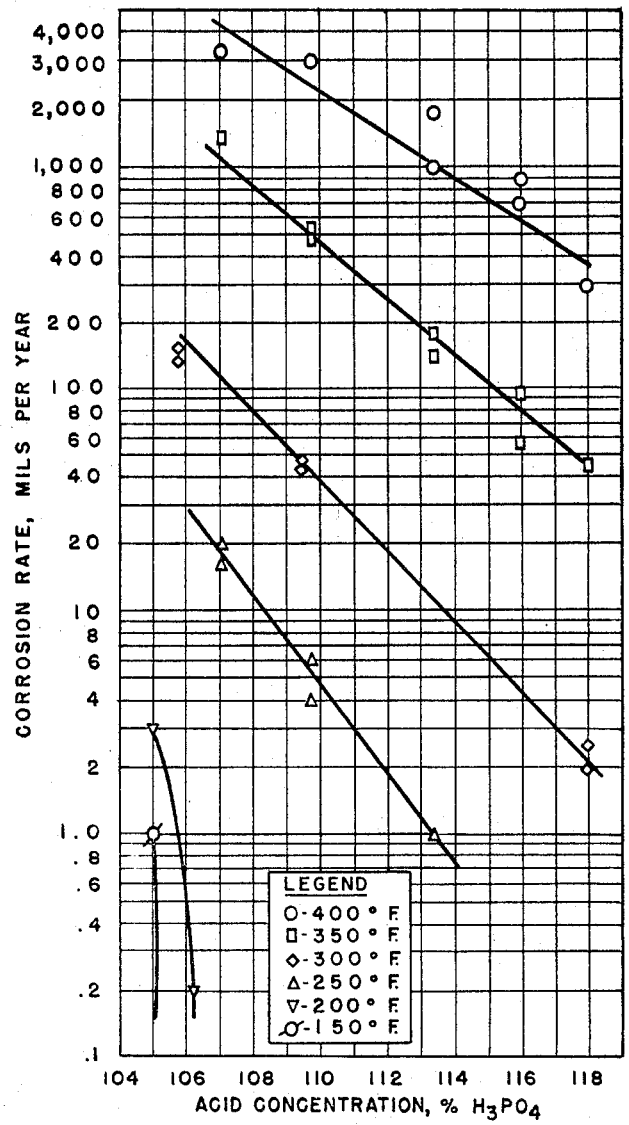
FIGURE 3 is a graphical illustration of the effect of acid concentration and temperature on static corrosion rates of stainless steel type 316 ELC and illustrates the phenomena that the corrosion rate decreases as the acid concentration increases.

In order to produce the highly concentrated acid, it was first proposed to operate the plant unit so that the acid leaving the hydrator in a water-jacketed pipe is in a temperature range which will cause the acid to have an acceptably low viscosity. When 76 percent $P_2O_5$ acid was produced, the hydrator outlet acid temperature was limited to 280° F. FIGURE 2 shows that the viscosity of the acid under these conditions was 16 centipoises. However, the corrosion rate decreases as the acid concentration increases (FIGURE 3). The hydrator outlet acid temperature was allowed to increase to 350° F. when 84 to 85 percent $P_2O_5$ acid was produced at which temperature the corrosion rate was acceptable. The viscosity of 84 percent $P_2O_5$ acid at 350° F. is approximately 60 centipoises.

Figure 4:
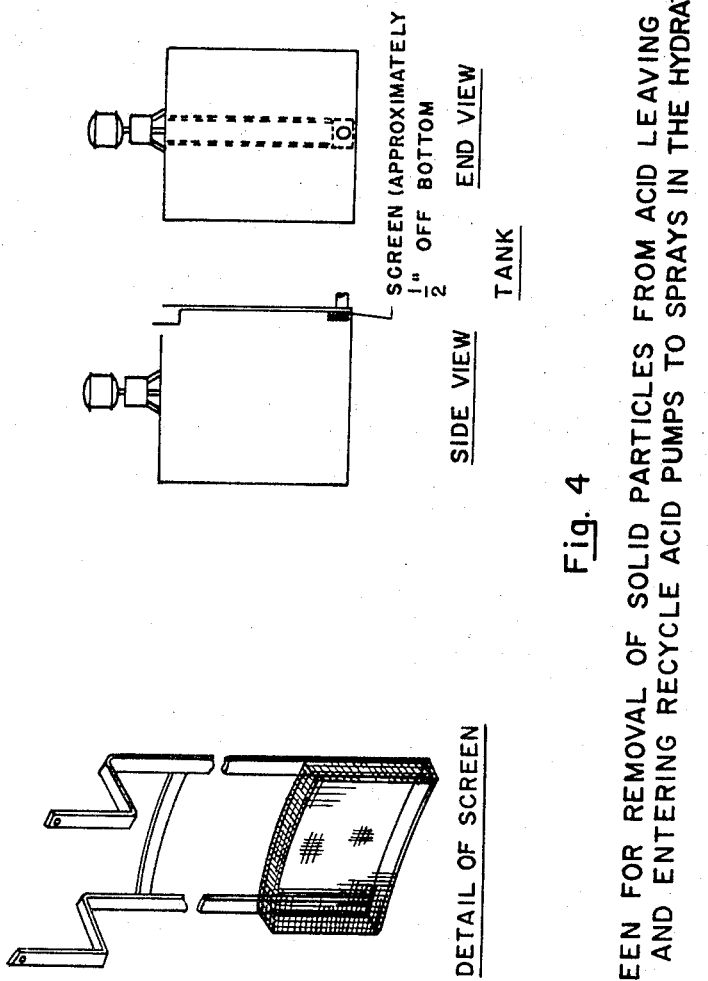
FIGURE 4 illustrates in detail the strainer installation in the cooling tank and by means of a side view and end view depicts the location of same.

Solid acid particles formed in the hydrator, probably in the acid flowing down the hydrator walls. Chunks of the solid acid flowed in recycle cooled product acid and stopped the 3-inch full spray nozzle in the top of the hydrator. Solid acid also deposited on the walls of the converging duct upstream of the venturi. Analyses of these particles taken from acid in the cooler tank showed that they contain 92 percent $P_2O_5$. Rates of solution of the solid particles in various concentrations of acid at various temperatures are given in Table III, infra. The data in Table III show rapid increase in solubility of the solid acid particles in concentrated acid as the solvent acid temperature increases. Ideas for coping with the problem of solid acid particles in the acid included retaining the particles in the cooler tank in contact with the hot concentrated acid until they are dissolved. A strainer was provided in the cooler tank to retain the solid particles in this tank until they dissolved. The strainer also removed the particles from the stream of acid pumped to the sprays. The strainer openings were slightly smaller than the spray nozzle openings. A special spray was installed upstream of the venturi scrubber to dissolve the solid acid particles and to flush them through the venturi scrubber. FIGURES 4 and 5 illustrate the strainer installation and the venturi modifications.

Figure 6:
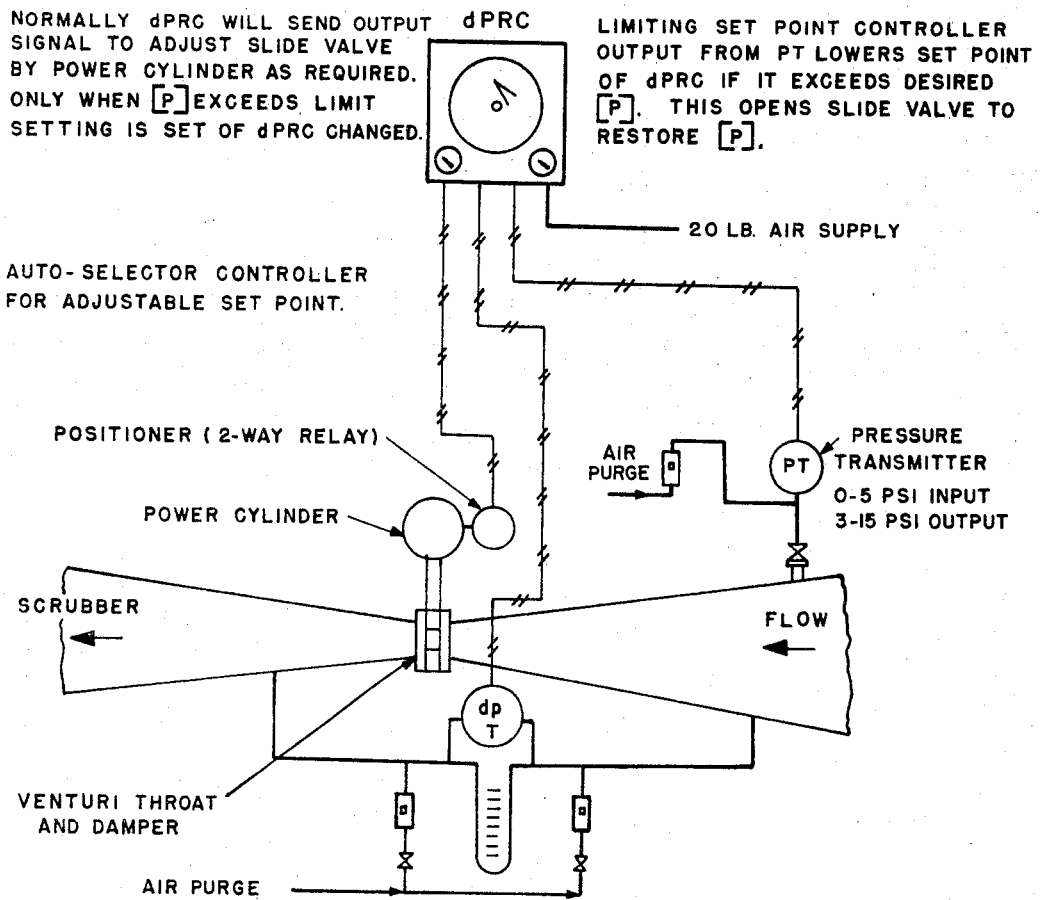
FIGURE 6 shows the means for automatic control of the pressure drop across the venturi scrubber by a damper device to maintain low losses of $P_2O_5$ from the unit.

A further idea involved automatic control of the pressure drop across the venturi scrubber by a damper device to maintain low losses of $P_2O_5$ from the unit (FIGURE 6). According to this arrangement, the hot gases from the combustion chambers flowed directly to a venturi scrubber for cooling, hydration, and coalescence of acid droplets. The pressure drop across the venturi scrubber was automatically adjusted for a preset pressure drop to assure efficient recovery of $P_2O_5$ from the unit.

TABLE III.—RATES OF SOLUBILITY OF SOLID PHOSPHORIC ACID PARTICLES IN VARIOUS CONCENTRATIONS OF ACIDS

| Concentration of phosphoric acid used as solvent, percent $P_2O_5$ | Solvent acid temperature, °F. | Solid acid material undissolved after— | |
|---|---|---|---|
| | | 1 hour, percent of total | 2 hours, percent of total |
| 76.0 | 250 | 76.81 | 73.88 |
| 76.0 | 300 | 51.89 | 44.17 |
| 79.6 | 250 | 20.92 | 20.34 |
| 79.6 | 300 | 7.44 | 6.85 |
| 79.6 | 350 | 4.55 | 4.03 |
| 79.6 | 400 | [1] 0.00 | [1] 0.00 |
| 80.4 | 250 | 91.41 | |
| 80.4 | 300 | 77.67 | |
| 80.4 | 350 | 70.53 | |
| 80.4 | 400 | 59.05 | |
| 83.3 | 250 | 95.21 | 90.42 |
| 83.3 | 300 | 91.11 | 83.31 |
| 83.3 | 350 | 90.83 | 79.68 |
| 83.3 | 400 | 82.43 | 61.00 |

[1] In the temperature range 360°–396° F. all the solid acid particles dissolved in 30–40 minutes.

Figure 7:
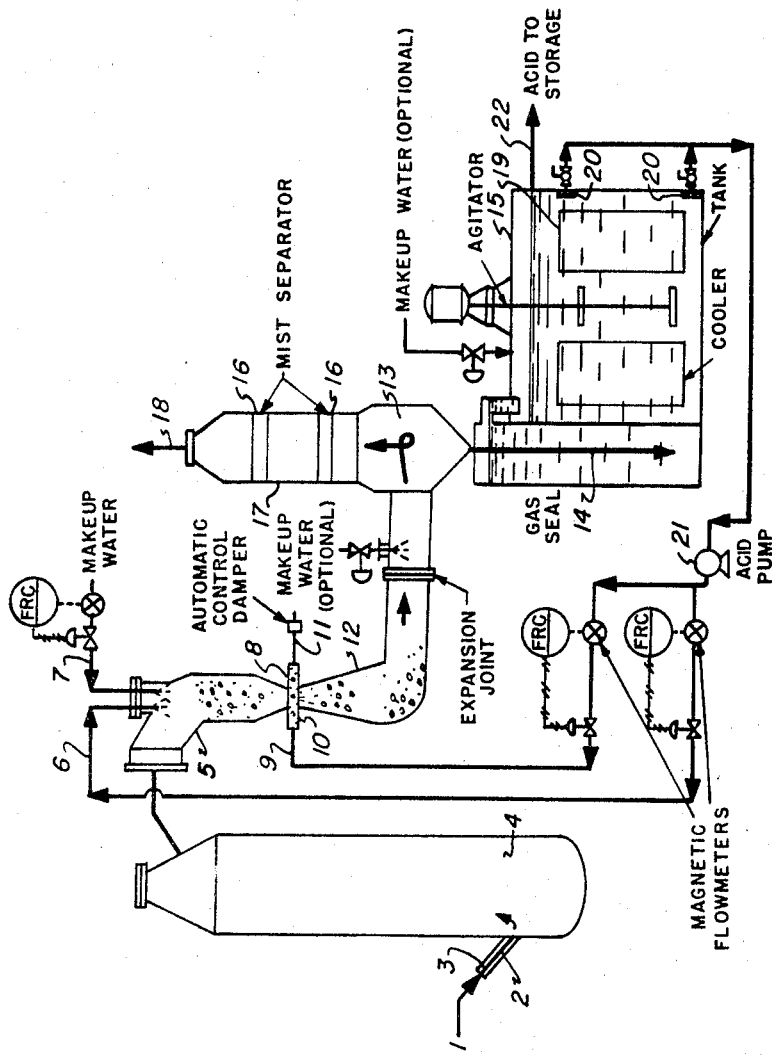
FIGURE 7 is a flowsheet in block diagram form illustrating the principles of our novel process which results in the production of highly concentrated superphosphoric acid containing up to 85 percent $P_2O_5$.

Referring now more specifically to FIGURE 7, phosphorus 1 flows to a burner 2 where it is atomized with air 3 and burns in a combustion chamber 4. The hot $P_2O_5$ laden gases flow upward through the combustion chamber and then into a vertical duct 5 where they mix with a spray of recycled, cooled strong acid 6 and a spray of makeup water 7 which causes partial cooling of gases and partial hydration of the phosphorus pentoxide. The mixture of liquid spray and gas flows through the throat of the venturi 8 where it mixes with cooled recycled product acid 9 discharged from sprays 10 on both sides of the venturi throat. A manually or an automatically operated damper 11 installed upstream of the venturi throat controls the differential pressure across the venturi. The liquid-gas mixture passes through the cooled product acid spraying into the venturi throat, and its pressure is decreased which causes further cooling of the mixture, final hydration of $P_2O_5$, and coalescence of phosphoric acid into particles of size that can be recovered. Next, the gas-liquid mixture flows through gas duct 12 to conventional centrifugal separator 13 where the phosphoric acid separates from the gas stream and flows downward through a water-jacketed seal leg 14 into a product acid cooler tank 15. Gas flows upward from the separator 13 through two conventional demister pads 16 installed in series in a chamber 17 and finally out through a stack 18 to the atmosphere. The product acid is cooled by a cooler unit 19 in the tank 15. Recycled acid flows through a strainer 20 located inside the cooler tank to an acid pump 21 and hence back to sprays 6 and 9. Product acid flows through a trough 22 to storage. All of the process vessels, ducts, or piping exposed to acid or gas at temperatures above 260° F. is water-jacketed except the shell of the product acid cooler tank that is cooled by water from sprays.

In order that those skilled in the art may better understand how the present invention can be practiced and more fully and definitely understood, the following examples of processes and apparatus we have used in the preparation of highly concentrated superphosphoric acid containing up to 85 percent $P_2O_5$ and of the character indicated herein is given by way of illustration and not by way of limitation.

EXAMPLE I

Phosphorus containing 99.8 percent $P_4$ was burned in the acid unit shown in FIGURE 1. The phosphorus was burned in the two combustion chambers at a total rate of 3,700 pounds per hour with 20 to 30 percent excess air. Temperature of the gas leaving the combustion chambers was 1310° F. Flow of the weak acid to the hydrator was gradually reduced over a period of several hours to increase the concentration of the product acid from the usual concentration of 80 percent $P_2O_5$ up to 85 percent $P_2O_5$. Flow of makeup water into weak acid in the scrubber tower was likewise decreased as necessary to maintain a constant level in the weak acid receiver tank. The temperature of the gas leaving the hydrator was 490° F. The concentration of the weak acid gradually increased from 54 percent to a maximum of 66 percent $P_2O_5$. Solid particles of metaphosphoric acid were observed floating in the product acid as the concentration of the product acid in the cooler increased. Analyses of these solid particles showed that they contained 92.3 percent $P_2O_5$. The solid acid particles had formed in the hydrator.

A screen that had been installed in the outlet of the product acid cooler retained the solid particles in the cooler tank so they could be dissolved and prevented them from flowing with the recycle acid and stopping the spray nozzle in the top of the hydrator. Thus, the screen made it possible to keep the acid flowing to the spray in the hydrator and consequently to prevent excessive temperatures in the hydrator. To prevent stoppage of the throat of the venturi scrubber by condensed solid acid a spray nozzle had been installed to provide a flow of weak acid (66 percent $P_2O_5$) at a rate of 15 gallons per minute cocurrent with the gas stream upstream of the venturi. This flow of spray acid dissolved solid acids that formed on the duct upstream of the venturi and the resultant solution flowed through the venturi throat and thence to the bottom of the separator tower and finally to a weak-acid receiver.

During previous operation without the spray, the venturi scrubber throat had become stopped with accumulations of the solid acid. Temperature of the product acid leaving the hydrator gradually increased as the concentration of product acid increased and leveled off at 350° F. when the concentration of the product acid leveled off at 84 percent $P_2O_5$. Operation of the plant while producing the 84 percent $P_2O_5$ was steady and there were no operating problems. Solid acid particles were effectively retained in the product cooler to prevent stoppage of the spray nozzle in the top of the hydrator. The acid spray applied to the duct walls upstream effectively prevented accumulation of large solid acid particles and thereby prevented stoppage of the venturi throat. Overall recovery during the operation producing 84 percent $P_2O_5$ acid was 99.9 percent of the phosphorus burned. Fifty percent of the $P_2O_5$ was recovered in the hydrator and the remainder was recovered as weak acid (66 percent $P_2O_5$) which was returned to the hydrator as a spray and came out of the hydrator as product acid. During the operation of producing the 84 percent $P_2O_5$ acid, 54 percent of the heat was removed at the combustion chambers, 22 percent at the hydrator (including the said cooler, 5 percent at the weak acid recovery system, 4 percent of the heat was in the exhaust gas, and 15 percent of the heat input was unaccounted for.

EXAMPLE II

Phosphorus was burned in one of the two combustion chambers in the acid unit shown in FIGURE 1. The phosphorus was burned at a rate of 3,000 pounds per hour with 45 percent excess air. Gases from the combustion chamber entered the hydrator at a temperature of 1460° F. In the hydrator, the hot gases were contacted by a spray of cooled recycled acid and by a spray of weak acid from the acid recovery system. The cooled acid spray rate was 162 gallons per minute and the acid temperature was 165° F. The weak acid spray rate was 10 gallons per minute and its temperature was 140° F. The gases were cooled in the hydrator to a temperature of 280° F., and in the venturi scrubber the gases were further cooled at 144° F. Acid was sprayed into the venturi scrubber at a rate of 276 gallons per minute and at a temperature of 140° F. The product acid concentration was 62.6 percent $P_2O_5$.

The production unit was operated as described above so as to determine whether or not the cooling of the gas by contact with the acid sprays in the hydrator could be carried out in the venturi scrubber. The flow of cooled product acid to the spray in the top of the hydrator was decreased so that the gas is only partly cooled by contact with these sprays, but all other operating variables at the unit were left unchanged. The gas still entered the hydrator at a temperature of 1460° F., but the gas entered the venturi scrubber at 720° F. The gas was partly cooled by contact with acid sprays in the hydrator. The gases were further cooled by a falling film of acid on the hydrator wall and by the cooling water in the hydrator jackets. A small flow of cooled product acid was continued in the spray in the top of the hydrator to protect the spray nozzle from corrosion by the hot gases. Cooling water was left on the jackets to protect the steel surfaces from corrosion. In the venturi scrubber the hot gases were cooled from 720° F. to 153° F. by the sprays in the venturi scrubber, showing adequate cooling and hydration of the hot gases by contact with the sprays in the venturi scrubber. Although substantial cooling of the hot gases was obtained in the hydrator with minimum operating of the spray, the test illustrates that cooling and hydration of the gases can take place in a venturi scrubber without the need of a hydrator.

As is noted above, in this example the production unit was operated principally to determine whether or not the cooling of the gas by contact with the acid sprays in the hydrator could be carried out in the venturi scrubber. It should be noted that the acid produced in this example contained only about 62 percent $P_2O_5$. This is the usual strength for food-grade phosphoric acid presently made by the industry and this example, therefore, further shows that our new, novel, and unique embodiments can be incorporated in the production of such food-grade acid. It should be noted, however, that perhaps the greatest benefit to be reaped from our invention will be realized by producers of superphosphoric acid who endeavor to produce acids greater than the maximum strength shown in Striplin, supra, i.e. about 80 percent $P_2O_5$. Thus, we have emphasized and will emphasize that the greatest attribute of our invention will be realized by producers of superphosphoric acid endeavoring to produce acids greater than about 80 percent $P_2O_5$ and upwards to the maximum that we have actually produced in our production facilities of about 85 percent $P_2O_5$. As a matter of fact, it is envisioned that when the need arises for still stronger acids (i.e., above 85 percent $P_2O_5$) our new novel, and unique invention will be beneficial to such acid production.

EXAMPLE III

This example represents the manner in which a modified acid unit would operate to produce on a large scale phosphoric acids containing up to 85 percent $P_2O_5$.

The acid unit shown in FIGURE 7 comprises: a combustion chamber; a duct with spray nozzles for makeup water for hydration and recycle cooled product acid; a venturi scrubber; a conventional centrifugal separator; a gas seal pipe that extends into a product acid cooler that has screens attached over outlet pipes to pumps; two conventional demister pads in series in a chamber above the conventional centrifugal separator; and air blowers and acid pumps. All of the process equipment exposed to acid or gas at temperatures above 260° F. is water-jacketed except the shell of the product acid cooler tank that is cooled by water from sprays.

Phosphorus flowed to a burner unit in the combustion chamber where it was atomized and burned with an excess of air. The hot $P_2O_5$ laden combustion gas flowed upward through the combustion chamber and then out into a vertical duct where it mixed with a spray recycle of cooled product acid and a spray of makeup water that at least partially hydrated the phosphorus pentoxide. But mainly these two sprays washed off and dissolved any solid particles of polyphosphoric acids that deposited on duct walls ahead of the venturi. Also, the spraying liquid decreased the temperature of the process gas. The mixture of liquid spray and gas flowed through the throat of the venturi where it mixed with cooled recycle product acid discharged from sprays on either side of the venturi throat.

An automatically operated damper installed upstream of the venturi throat controlled the differential gas pressure across the venturi. The automatic controller had been preset to adjust the damper and maintain the differential gas pressure at 45 inches of water. Passage of the liquid-gas mixture through the cooled product acid spraying into the venturi throat and into a gas duct where its pressure was 45 inches of water less than that of the gas-liquid mixture upstream of the venturi caused the gas to be cooled to a temperature within 5° F. to 50° F. usually, or 110° F. at maximum, of the temperature of the cooled product acid. Also, the aforedescribed passage of the gas-liquid mixture through the venturi caused complete hydration of the $P_2O_5$ and coalesced phosphoric acid particles into larger particles amenable to about 99.9 percent recovery in a conventional separator mentioned below.

Next, the gas-liquid mixture flowed to a conventional centrifugal separator where the previously coalesced particles of phosphoric acid separated from the gas stream and flowed downward through a water-jacketed seal leg into a product acid cooler tank. Gas flowed upward from the separator and through two conventional demister pads installed in series in a chamber and finally out through a stack to the atmosphere. The $P_2O_5$ lost in the gas leaving the plant was less than 6 pounds per hour. Acid was cooled in the Platecoil type product acid cooler to less than 210° F. when acid containing $P_2O_5$ equivalent to 76 percent $P_2O_5$ was being produced (or to less than 200° F. when 72 percent $P_2O_5$ acid was being produced or to less than 260° F. when 85 percent $P_2O_5$ acid was being produced).

Acid flowed through strainers mounted inside the cooler tank and into pipes leading to recycle acid pumps. These screens retained large solid particles of polyphosphoric acids that would subsequently have entered and stopped the acid spray nozzles. While being retained on the screens, the solid particles of acid were subjected to turbulent flow of acid inside the cooler and gradually dissolved. The acid produced overflowed from the tank to a product acid receiver tank from which it was pumped to storage. Product acid concentration was easily controlled by regulation of the flow rate of makeup water for acid hydration. By regulating the makeup water flow rate any strength of product acid desired was produced.

This acid unit would require only one acid pump (and one spare) because only one strength acid had to be pumped. Flow of cooled product acid to the spray upstream of the venturi was controlled by means of a flow recorder controller. Also, the flow of cooled product acid to sprays in the venturi throat was controlled by means of a flow recorder controller. The flow of acid to the spray upstream of the venturi and to the venturi sprays was proportioned so that the temperature of gas leaving the venturi was within 110° F. maximum of that of the cooled product acid. But the larger proportion of these flows was passed through the sprays of the venturi scrubber.

Phosphorus was burned in the acid production unit at a rate of 3,000 pounds per hour with 30 percent excess air. The flow rates of cooled product acid to the duct and to the venturi were adjustable to give operating temperature conditions within the following approximate ranges:

|  | Temperatures when the product acid contains— | | | |
| --- | --- | --- | --- | --- |
|  | 72 percent $P_2O_5$ | 76 percent $P_2O_5$ | 80 percent $P_2O_5$ | 85 percent $P_2O_5$ |
| Gas at venturi inlet, °F | 300–750 | 300–750 | 300–750 | 300–750 |
| Gas at venturi outlet, °F | 150–280 | 185–280 | 225–350 | 245–350 |
| Acid leaving venturi, °F | 160–280 | 190–280 | 230–350 | 250–350 |
| Acid leaving cooler, °F | 150–200 | 180–210 | 220–250 | 240–260 |

It should, of course, be recognized that the vapor pressure of water over the acids, particularly the unusually highly concentrated acids with which we are working, is extremely low. For example, when the acid contains about 85 percent $P_2O_5$ and is at a temperature of about 350° F., the gases leaving the mist separator will contain less than 0.1 percent water. On the other hand, if the acid contains only about 72 percent $P_2O_5$ and is at a temperature of about 280° F., the gases leaving the mist separator will contain about 2.7 percent water vapor. Consequently, negligible cooling of acid will result from evaporation of water in this process. It therefore follows that a portion of the makeup water for hydration may be added onto the mist separator pads to wash down droplets of superphosphoric acid that would otherwise restrict gas flow.

While we have shown and described particular embodiments of our invention, modifications and variations thereof will occur to those skilled in the art. We wish it to be understood therefore that the appended claims are intended to cover such modifications and variations which are within the true scope and spirit of our invention.

What we claim as new and desire to secure by Letters Patent of the United States is:

1. An improved process for the production of unusually highly concentrated phosphoric acid containing up to about 85 percent $P_2O_5$, which comprises the steps of feeding elemental phosphorus to a combustion zone; burning said elemental phosphorus in air in said combustion zone; passing the resulting hot phosphorus pentoxide, containing combustion gases at an initial temperature in the range of about 1000° F. to about 2000° F., into a vertical cooling-hydration-absorption-coalescing zone; introducing makeup water required for acid hydration into said cooling-hydration-absorption-coalescing zone; introducing cooled recycled phosphoric acid containing from about 72 to about 85 percent $P_2O_5$ and at a temperature in the range from about 150° F. to 260° F. into said cooling-hydration-absorption-coalescing zone to partially cool said hot combustion gases from the range of about 1000° F. to about 2000° F. down to the range of about 300° F. to about 750° F., said introduction of said cooled recycled phosphoric acid into said cooling-hydration-absorption-coalescing zone sufficient to substantially eliminate build-up of a layer of solid polyphosphoric acids on the walls of said cooling-hydration-absorption-coalescing zone upstream of a later-mentioned venturi throat; adjusting the relative proportions of said water and said acid introduced to maintain in said cooling-hydration-absorption-coalescing zone a concentration of about 72 to about 85 percent $P_2O_5$ in the resulting superphosphoric acid; introducing additional cooled superphosphoric acid at a temperature in the range of about 150° F. to about 260° F., and containing from about 72 to about 85 percent $P_2O_5$ into sprays in the throat of a venturi scrubber in said cooling-hydration-absorption-coalescing zone; adjusting the flow of said acid into said venturi throat to maintain the temperature of the gases leaving said venturi throat in the temperature range of about 150° F. to about 350° F. and simultaneously increasing the temperature of the acid flowing through said venturi throat from the range of about 150° F. to 260° F. up to the range of about 160° F. to about 350° F.; adjusting a damper in said venturi throat to maintain a gas pressure differential across said venturi throat in the range of about 38 inches to about 60 inches of water; passing said acid at a temperature in the range of about 160° F. to about 350° F. and said gas at a temperature in the range of about 150° F. to about 350° F. from said venturi throat into a vertical acid collection zone; passing said acid, the resulting coalesced droplets of acid, and said gas into a cyclonic separator in said collection zone; passing said gas from said cyclonic separator upward through a mist separator in said collection zone and collecting residual droplets of acid in said mist separator; passing said gas, containing less than about 0.1 percent of the $P_2O_5$ equivalent of the phisphorus fed to said process, and at a temperature in the range of about 150° F. to 350° F. into a vent stack to the atmosphere; withdrawing product acid containing from about 72 percent to about 85 percent $P_2O_5$ and at a temperature in the range from about 160° F. to about 350° F. from said collection zone into an acid cooling zone; cooling and maintaining the temperature of said product acid in said cooling zone in the range from about 150° F. to about 260° F.; withdrawing a portion of cooled product acid from said cooling zone and passing it to said spray in said venturi throat in said cooling-hydration-absorption-coalescing zone; and withdrawing as product the remaining portion of said cooled acid from said cooling zone containing at least about 99.9 percent of the $P_2O_5$ equivalent of the phosphorus fed to said process;

said process characterized by the fact that maintenance of said gas pressure differential across said venturi throat in the range from about 38 inches to about 60 inches of water effects rapid and complete hydration and coalescence of phosphoric acid particles in the mixture of said acid and said gases, and causes effective cooling of the gas stream from temperatures in the range of about 300° F. to about 750° F. to temperatures in the range from about 150° F. to about 350° F. in said cooling-hydration-absorption-coalescing zone such that from about 99.9 percent to about 99.96 percent of the $P_2O_5$ produced by said combustion of said elemental phosphorus is collected in said collection zone.

2. The process of claim 1 in combination with addition of 10 to 100 per cent of the required makeup water for acid hydration into the acid stream flowing into the cyclone separator in the acid collection zone.

3. The process of claim 1 in combination with addition of 10 to 100 percent of the required makeup water for acid hydration into the acid in the acid cooling zone.

4. The process of claim 1 wherein the concentration of the liquid product is increased in order to decrease the corrosiveness of said product and to permit the temperature of said product to be increased such that said product can be effectively agitated in a cooling zone and a portion of said product acid can be effectively recycled in different zones of the process.

5. The process of claim 1 wherein the concentration of the liquid product is increased to decrease the corrosiveness of said product and permit the temperature of said product to be increased such that said product will retain its components in solution and will dissolve similar solid components formed in different zones of the process.

No references cited.

OSCAR R. VERTIZ, *Primary Examiner.*

ARTHUR GREIF, *Assistant Examiner.*

U.S. Cl. X.R.

23—259.2, 262, 287; 261—64, 116